United States Patent [19]

Nieberding, Jr.

[11] Patent Number: 4,699,260

[45] Date of Patent: Oct. 13, 1987

[54] MOUNTING ASSEMBLY FOR PROTECTIVE LIGHTING SYSTEM FOR METAL FORMING MACHINE OR THE LIKE

[76] Inventor: Howard A. Nieberding, Jr., 13010 Fairfield Trail, Chesterland, Ohio 44026

[21] Appl. No.: 912,687

[22] Filed: Sep. 26, 1986

Related U.S. Application Data

[63] Continuation of Ser. No. 788,095, Oct. 16, 1985, which is a continuation of Ser. No. 485,960, Apr. 18, 1983.

[51] Int. Cl.⁴ ............................................. F16D 71/00
[52] U.S. Cl. ...................................... 192/134; 100/53
[58] Field of Search ................... 192/129 A, 133, 134, 192/135, 131 R; 100/53

[56] References Cited

U.S. PATENT DOCUMENTS

| | | | |
|---|---|---|---|
| 1,849,303 | 3/1932 | LaBaw | 248/188.5 |
| 2,180,238 | 11/1939 | Hoke | 192/133 |
| 2,714,926 | 8/1955 | Nichta | 74/608 |
| 3,164,351 | 1/1965 | Rembowski | 248/188.5 |
| 3,171,627 | 3/1965 | Tapley et al. | 248/188.5 |
| 3,952,989 | 4/1976 | Hatcher | 248/460 |
| 4,039,060 | 8/1977 | Williams et al. | 192/134 |
| 4,060,160 | 11/1977 | Lieber | 192/134 |

FOREIGN PATENT DOCUMENTS 111836 10/1925 Switzerland ........................ 248/460

*Primary Examiner*—George H. Krizmanich
*Attorney, Agent, or Firm*—Watts, Hoffmann, Fisher & Heinke Co.

[57] ABSTRACT

A mounting assembly for detachable connection to a metal forming machine, such as a punch press or the like, including a pair of bracket members pivotally mounted for swingable movement about a vertical axis toward and away from one another with one of the bracket members mounting an electrical energy source and the other mounting a receiver member for generating a protective light-curtain therebetween. Pivot members are operatively associated with each of the bracket members for enabling the same to pivot about a vertical axis, and selectively adjustable locking members for locking either of the bracket members in fixed relation to one another.

4 Claims, 10 Drawing Figures

MOUNTING ASSEMBLY FOR PROTECTIVE LIGHTING SYSTEM FOR METAL FORMING MACHINE OR THE LIKE

This application is a continuation of application Ser. No. 788,095 filed Oct. 16, 1985 which is a continuation of application Ser. No. 485,960 filed Apr. 18, 1983.

TECHNICAL FIELD

The present invention relates generally to protective equipment for metal forming machines and more particularly relates to a new and improved light curtain mounting assembly for use with metal forming machines, such as a punch presses or the like. More specifically, the invention relates to a mounting assembly for an operator protective system of the type which embodies a light curtain (electric eye) to protect the operative body components of the operator (i.e. arms and hands) during operation of the punch press.

BACKGROUND ART

Heretofore, it has been known to provide various protective guards or shields to reduce injury to operators of various types of machines in the metal forming industry. In many applications, it is a requirement that various of the machine tools be provided with such protective devices to reduce accidental injury to the machine operators. In such instances, it has been known provide what is commonly referred to as a "light curtain" which system generally includes an energy source (i.e. electrode and/or light beam, laser and the like) and a receiver for the energy source that provide, in effect, a barrier or curtain. If this barrier or curtain is broken, such as by the operator's extremity (i.e. arm or hand) blocking transmission of the energy source to the receiver the electrical system is energized, as known in the art, to automatically turn-off operation of the machine tool thereby preventing injury to the operator. For example, by preventing closing of the metal forming die in a punch press prior to the time when the operator's extremity may have otherwise been accidentally inserted between the dies during closing thereof. However, in such prior light curtain systems, the components thereof, have generally been disposed in a fixed or stationary mode thereby limiting the general flexibility and usability of the system on various type machines and/or for working on various sizes and/or shapes of metal parts to be formed. Accordingly, while prior light curtain systems have been satisfactory from a safety standpoint, they have not been entirely satisfactory in providing a mounting assembly therefore which enables the component parts of the system to be selectively adjusted and articulated to accommodate various sizes and shapes of a metal workpiece and to enable the set-up operator to quickly and easily effectuate the proper die setting.

DISCLOSURE OF THE INVENTION

A light curtain assembly for detachable mounting on the chasis of a machine tool, such as a punch press or the like, comprising a frame structure adapted to be detachably connected to the machine tool with said frame structure mounting a pair of pivotally mounted support bracket members disposed for swinging in and out movement and including selectively adjustable means for locking said bracket members in any predetermined closed or open position. The bracket members each being pivotable about a vertical axis through an angle of up to 90° with said selectively adjustable means capable of locking either of the bracket members in any predetermined angular orientation within such 90°. One of said bracket members mounting an energy source for transmitting an energy defining screen, such as in electron and/or light beam, laser beam or the like, to a receiver member for providing an uninterrupted energy-curtain adapted for providing a protective guard or shield against accidental or inadvertent injury to an operator by reason of normal operation of the machine tool. In the invention, the energy source and/or the receiving member are pivotally mounted for rotational movement about a vertical axis on said bracket members for predetermined selective orientation of the energy-curtain relative to the machine tool. In the invention, the bracket members are each selectively adjustable in a telescoping length-wise direction so as to provide decreased or increased expansion size to accommodate various size and/or shapes of work pieces to be supported for metal forming operations on the machine tool.

In accordance with the present invention, there is provided such energy-curtain which can be accommodated for use with various standard size metal forming machines, such as punch presses or the like, which can be quickly and easily detachably mounted on the machine tool, as an assembly or package. The energy-curtain assembly incorporates linear expansion and pivotal swinging characteristics such as to accommodate various sizes and/or shapes of workpieces thereby to provide a protective guard or shield for practically any size punch press, for example, thereby to minimize the necessity to procure and/or inventory various size components required to install and utilize a prior type light-curtain system. Accordingly, by the present invention there is provided a protective system which as increased flexibility and hence, application for accommodating various sizes and/or shapes of workpiece on a given size punch press, for example.

Other advantages and objects of the present invention will become apparent as the following description proceeds when taken in conjunction with the accompanying drawings.

BEST MODE FOR CARRYING OUT THE INVENTION

Figure 1:
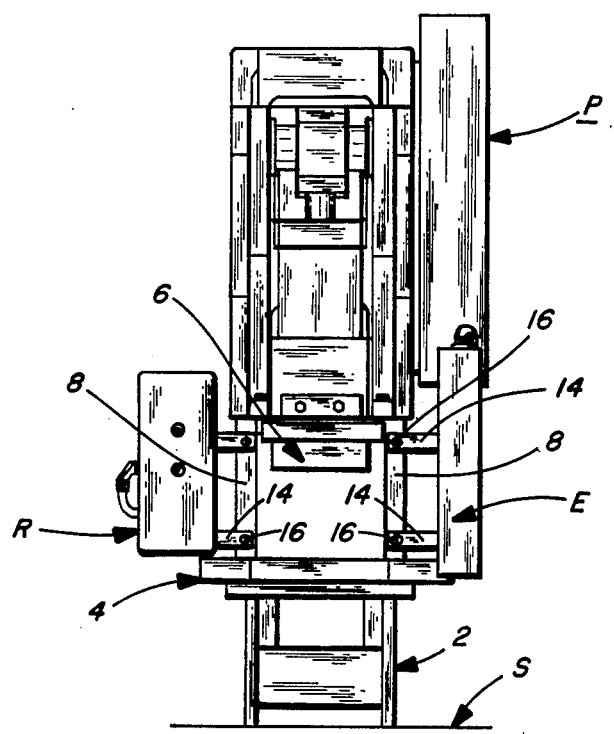
FIG. 1 is a front elevation view illustrating the light curtain mounting assembly of the present invention for use with a metal forming machine, such as a punch press.

Referring again to the drawings and generally to FIG. 1 thereof, there is illustrated a metal forming machine, designated generally at P, such as a punch press or the like. Such presses, in accordance with the invention, are known as Gap Frame Presses which may range in capacity from 30 to 200 tons. As shown, the press P includes a support base, designated generally at 2, which mounts a support table supported 4 by the machine frame F. The light curtain mounting assembly, designated at 6, of the invention is detachably mounted on the support column, as at 8, of the machine frame F, as best illustrated in FIG. 2.

Generally, in the embodiment illustrated the light curtain mounting assembly 6 includes an oppositely disposed pair of laterally spaced bracket members, as at 10, which are pivotally mounted on the machine frame F and are also telescopically adjustable in a linear direction with respect thereto. The bracket members 10 respectively mount an energy source, as at E, which generates electrical energy (i.e. electrode and/or light beam, laser and the like) for transmission to a receiver member, as at R, for receiving electrical energy from the energy source to provide a "light curtain" in a manner as known in the art. The bracket members 10 are preferably of an identical construction and hence, the following description will proceed wherein like reference numerals refer to like parts throughout.

Figure 2:
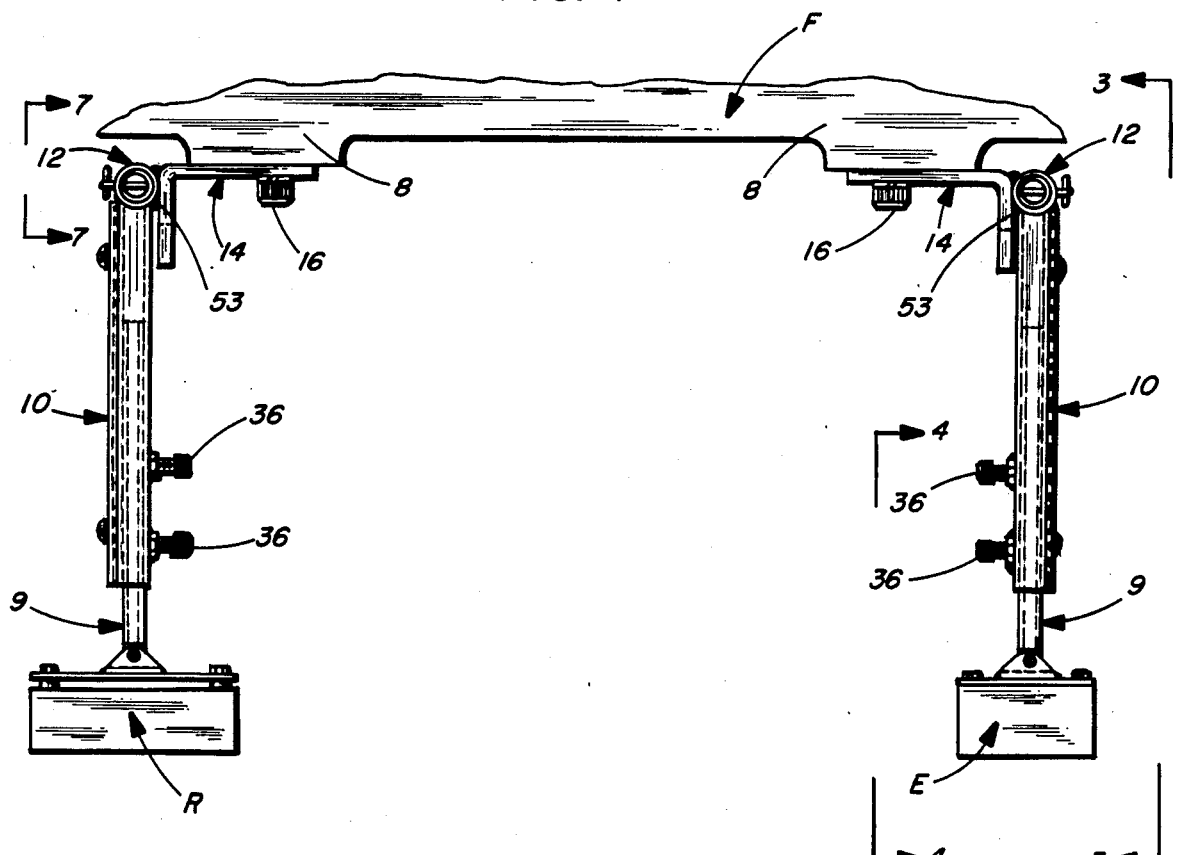
FIG. 2 is a fragmentary, top plan view with parts removed for purposes of clarity, on a enlarged scale, illustrating the light curtain mounting assembly of the invention.
Figure 3:
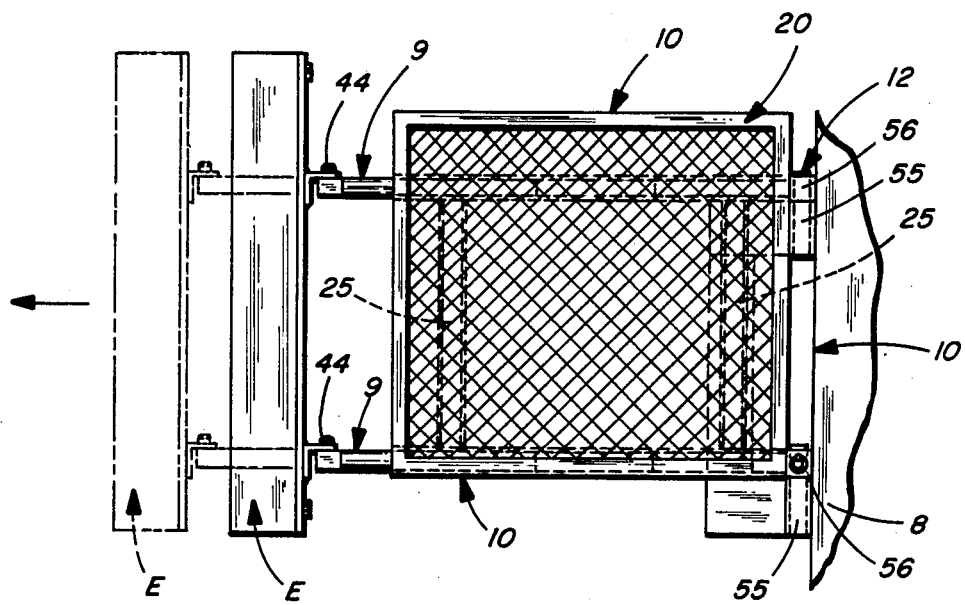
FIG. 3 is a fragmentary, side elevation view looking in the direction of the line 3—3 of FIG. 2.
Figure 4:
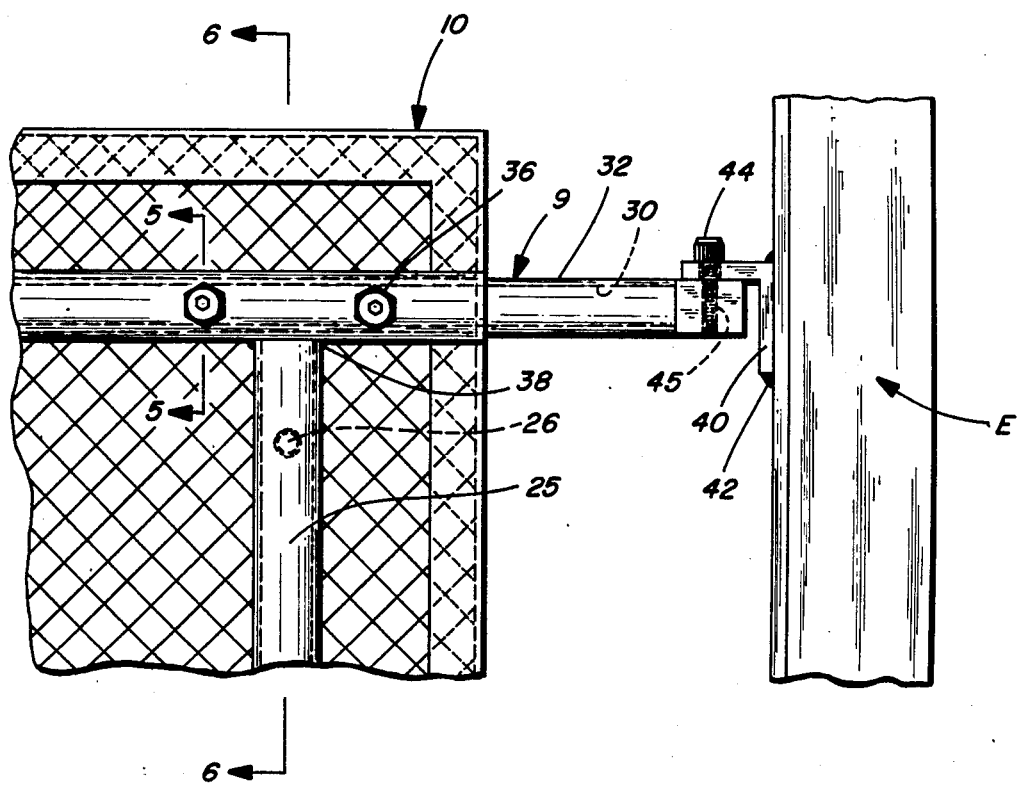
FIG. 4 is a fragmentary, side elevation view, on an enlarged scale, looking in the direction of line 4—4 of FIG. 2.
Figure 5:
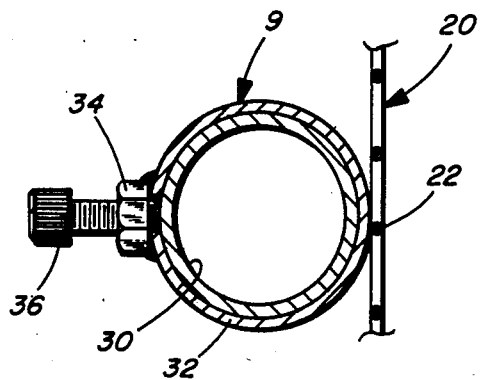
FIG. 5 is a fragmentary section view taken along the line 5—5 and along a reduced scale, in FIG. 4.
Figure 10:
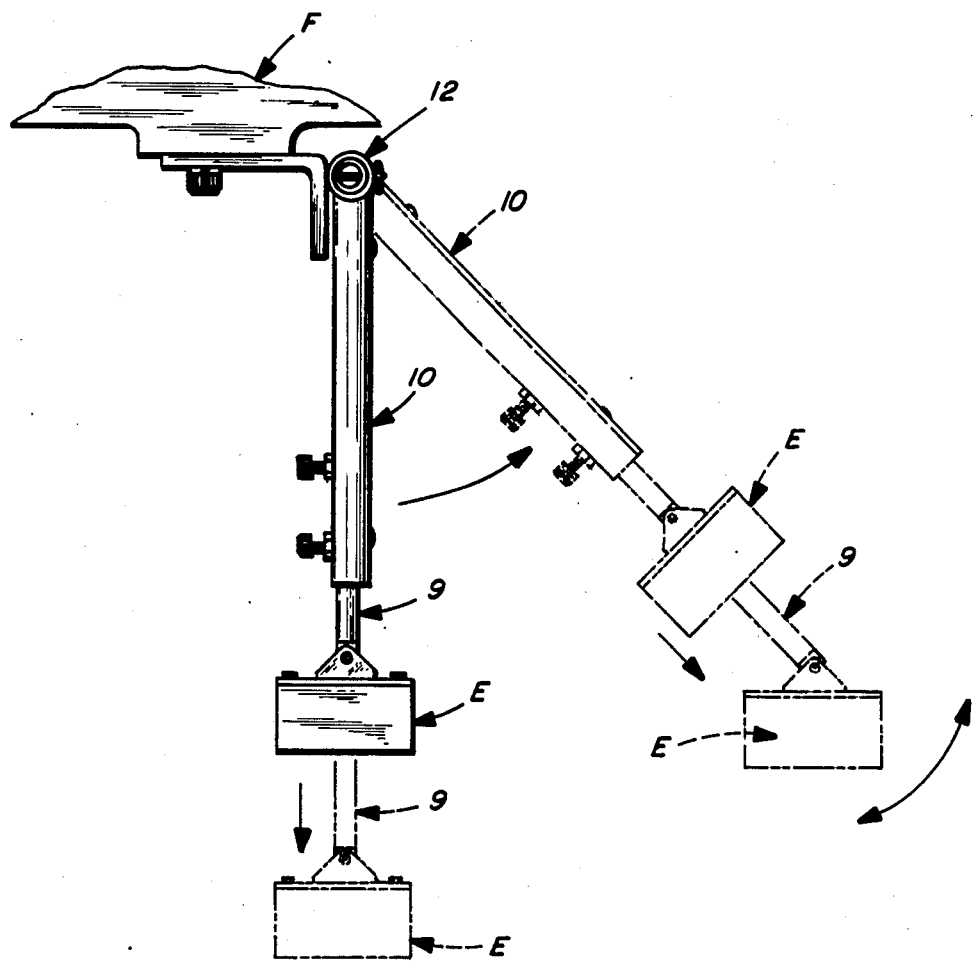
FIG. 10 is a fragmentary, top plan view illustrating the linear extension and pivotal movements of one of the mounting brackets for mounting the energy source in accordance with the present invention.

As best illustrated in FIGS. 2, 3 and 4, each bracket member 10 includes a pair of laterally spaced support tubes 9 which are connected to pivot points, as at 12. The pivot points are connected to generally L-shaped bracket plates 14 which are detachably connected to the frame column 8 via suitable fasteners 16. By this arrangement, the energy source, as at E, or the point 12 through 90°, as best illustrated in FIG. 10.

Figure 6:
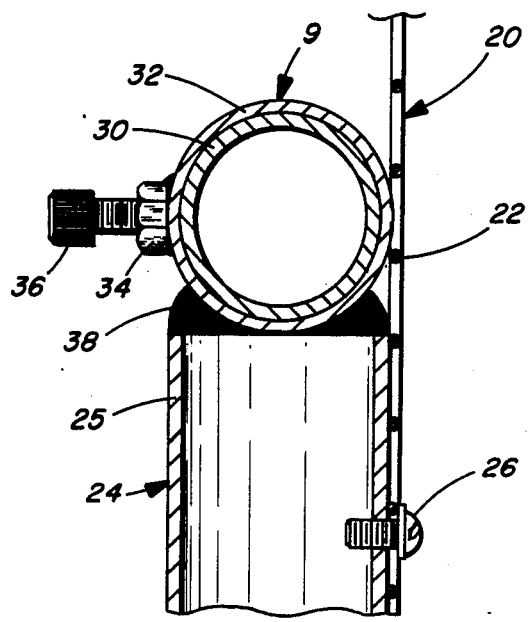
FIG. 6 is a fragmentary, section view on an enlarged scale taken along the line 6—6 of FIG. 4.

Each bracket member 10 includes a rectangular frame structure, as at 20, which has a wire mesh 22 or screen guard of a metallic material to provide protection against side entry into the work area of the press. As best illustrated in FIGS. 3, 4, 5 and 6, a bracket member 10 is carried by a tubular support structure, designated generally at 24, which includes a pair of laterally spaced vertical tube members 25 which are attached to the screen 22 by suitable fasteners 26, as illustrated in FIG. 6. The vertical tubes 25 are welded, as at 38, to laterally spaced horizontal tubes 32 which telescopically mount therein inner tube members 30 that, in turn, mount their respective energy source member E and receiver member R for telescopic movement inwardly and outwardly away from the machine frame. Telescopic sliding movement of the inner tube members 30 relative to the outer tube members 32 (FIG. 5) can be selectively adjusted by means of threaded screws, as at 36, which threadably extend through threaded nuts, as at 34, which are welded to the outside of the outer tubes 32. Accordingly, by selective adjustment of the screws 36 the energy and receiver members can be extended outwardly or inwardly as illustrated in dotted line in FIGS. 3 and 10.

Figure 7:
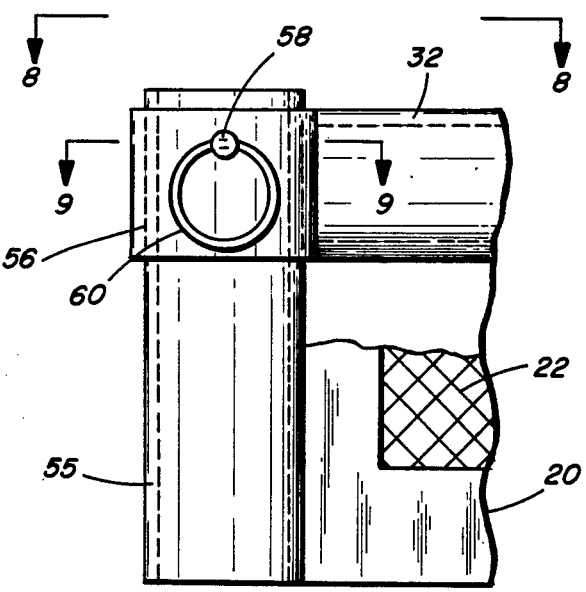
FIG. 7 is a fragmentary, side elevation view on an enlarged scale taken along the line 7—7 of FIG. 2.
Figure 8:
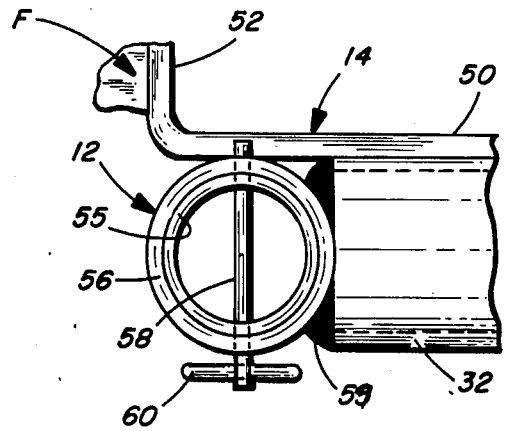
FIG. 8 is a fragmentary, top plan view looking in the direction of the line 8—8 of FIG. 7.
Figure 9:
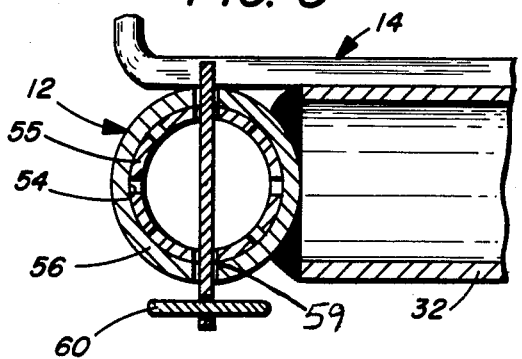
FIG. 9 is a fragmentary, section view taken along the line 9—9 of FIG. 7.

As best seen in FIGS. 7, 8 and 9, the pivot connections 12 includes a collar 56 which is welded, to outer horizontal tube member 32 which is welded, as at 53 (FIG. 2) to one arm, as at 50, of the bracket member 14. The other arm 52 of the bracket member is detachably connected to the machine frame, as aforesaid. The collar 56 is pivotally mounted on a hollow pin member 55 which is welded to the machine frame. The pin member has a series (FIG. 9) of apertures, as at 54, adapted to receive an elongated locking pin 58 which has a finger-grip ring 60 for selectively inserting the pin 58 through aligned apertures 59 thereby to regulate selective pivotal movement of the bracket members 10 about the vertical axis of the hollow sleeve members 55. By this arrangement, the bracket members 10 can be pivoted inwardly and outwardly as illustrated in FIG. 10 to increase or decrease the accessible work area of the press, as desired.

At their opposite ends, the support tubes 9 pivotally mount (FIG. 3) the respective energy and receiver members on another generally L-shaped bracket 40 which is welded, as at 42, to the energy member, as illustrated in FIG. 4. The bracket 40 threadably receives a suitable fastener, as at 44, via a threaded connection 45 such that the receiver member E, for example, may be pivoted about a vertical axis, as illustrated in dotted line in FIG. 10. Accordingly, by this arrangement the energy source and receiver members can be swung in and out about the pivot connections 12. And also, they can be pivotally adjusted about the pivot axes thereby to maintain the members in aligned relationship to provide a continuous light curtain so as to accommodate various size work pieces to be operated upon the machine press.

Other further advantages and objects of the present invention will become apparent when taken in conjunction with the accompanying claims.

I claim:

1. A mounting assembly for light curtin adopted for detachable connection to a metal forming machine, such as a punch press or the like, comprising a pair of oppositely disposed bracket members pivotally mounted on the forming machine for swingable movement about a vertical axis toward and away from one another, one of said bracket members mounting an electrical energy source member and the other of said bracket members mounting a electrical receiver member for generating therebetween a protective light-type curtain, pivot means operably associated with each of said bracket members for enabling said bracket members to pivot about a vertical axis in swinging movement toward and way from one another, and selectively adjustable locking means for locking either of said bracket members in fixed relation relative to the other of said bracket members.

2. A mounting assembly in accordance with claim 1, including telescopic means operably associated with at least one of said bracket members for extension and retraction in a linear direction, at least one of said energy source or receiver members carried by said telescopic means, and second selectively adjustable locking means for locking said telescopic means in a predetermined extended or retracted position.

3. A mounting assembly in accordance with claim 2, wherein at least one of said energy source or receiver members are pivotally mounted for pivotal movement about a vertical axis on said telescopic means.

4. A mounting assembly in accordance with claim 1, wherein each of said bracket members include telescopic means which carry said energy source and receiver members, said telescopic means being telescopically adjustable in an inward and outward direction, and said energy source and receiver members being mounted for pivotal movement about a vertical axis whereby said energy source and receiver members are maintained in a generally common vertical plane with respect to one another.

* * * * *

UNITED STATES PATENT AND TRADEMARK OFFICE
CERTIFICATE OF CORRECTION

PATENT NO. : 4,699,260
DATED : October 13, 1987
INVENTOR(S) : Howard A. Nieberding, Jr.

It is certified that error appears in the above-identified patent and that said Letters Patent are hereby corrected as shown below:

Column 1, line 30, before "provide", insert -- to --.

Column 2, line 38, "as" should be -- has --.

Column 3, line 43, before "point", insert -- receiver member, as at R, can be pivoted about the pivot --.

Column 4, line 51, "way" should be -- away --.

Signed and Sealed this

Eighth Day of March, 1988

Attest:

DONALD J. QUIGG

Attesting Officer     Commissioner of Patents and Trademarks